United States Patent
Shirai et al.

(10) Patent No.: US 12,454,270 B2
(45) Date of Patent: Oct. 28, 2025

(54) DETERMINING ROAD TYPES WITH IMAGING AND NON-IMAGING DETERMINATION MEASURES

(71) Applicant: TOYOTA JIDOSHA KABUSHIKI KAISHA, Toyota (JP)

(72) Inventors: Hayato Shirai, Tagata-gun (JP); Takashi Nishikiori, Numazu (JP); Sui Kurihashi, Sunto-gun (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/357,682

(22) Filed: Jul. 24, 2023

(65) Prior Publication Data

US 2024/0025415 A1 Jan. 25, 2024

(30) Foreign Application Priority Data

Jul. 25, 2022 (JP) ................. 2022-118070

(51) Int. Cl.
| | | |
|---|---|---|
| *G06V 20/58* | (2022.01) | |
| *B60W 30/16* | (2020.01) | |
| *B60W 40/06* | (2012.01) | |
| *B60W 50/14* | (2020.01) | |
| *G08G 1/00* | (2006.01) | |

(52) U.S. Cl.
CPC ............ *B60W 40/06* (2013.01); *B60W 30/16* (2013.01); *B60W 50/14* (2013.01); *G06V 20/582* (2022.01); *G06V 20/584* (2022.01); *G08G 1/22* (2013.01); *B60W 2420/403* (2013.01); *B60W 2552/05* (2020.02); *B60W 2554/80* (2020.02)

(58) Field of Classification Search
CPC .. G06V 20/582; G06V 20/584; G06V 20/588; B60W 2552/05
See application file for complete search history.

(56) References Cited

U.S. PATENT DOCUMENTS

| | | | |
|---|---|---|---|
| 6,351,698 B1 * | 2/2002 | Kubota | G01C 21/3608 704/E15.045 |
| 9,158,980 B1 * | 10/2015 | Ferguson | G08G 1/096775 |
| 2011/0144907 A1 | 6/2011 | Ishikawa et al. | |
| 2019/0311207 A1 * | 10/2019 | Oniwa | B60W 50/12 |
| 2021/0179138 A1 * | 6/2021 | Terazawa | G01C 21/3476 |
| 2022/0027640 A1 * | 1/2022 | Tosa | B60W 40/06 |

FOREIGN PATENT DOCUMENTS

| | | | |
|---|---|---|---|
| JP | 2000221049 A | 8/2000 | |
| JP | 2003127702 A | 5/2003 | |
| JP | 2009146289 A | 7/2009 | |

(Continued)

*Primary Examiner* — Kenneth J Malkowski
(74) *Attorney, Agent, or Firm* — Hunton Andrews Kurth LLP

(57) ABSTRACT

A vehicle control system includes an imaging device configured to capture an image of an outside of a host vehicle to generate an image and a control device. The control device is configured to determine a road type of a road on which the host vehicle is traveling by recognizing a specific object in the image, and take a determination measure for determining the road type of the road on which the host vehicle is traveling when the specific object cannot be recognized.

3 Claims, 4 Drawing Sheets

(56) References Cited

FOREIGN PATENT DOCUMENTS

| | | |
|---|---|---|
| JP | 2011122936 A | 6/2011 |
| JP | 2018531474 A | 10/2018 |
| JP | 2020170372 A | 10/2020 |
| JP | 2020173730 A | 10/2020 |
| WO | 2017035516 A1 | 3/2017 |

* cited by examiner

DETERMINING ROAD TYPES WITH IMAGING AND NON-IMAGING DETERMINATION MEASURES

CROSS-REFERENCE TO RELATED APPLICATION

This application claims priority to Japanese Patent Application No. 2022-118070 filed on Jul. 25, 2022, incorporated herein by reference in its entirety.

FIELD

The present disclosure relates to a vehicle control system, a computer program and a vehicle control method.

BACKGROUND

When a distance from a preceding vehicle in front of a vehicle becomes smaller, the field of view of a camera capturing a road division line on a road surface in front of the vehicle is blocked by the preceding vehicle. As a result, the road surface in front of the vehicle cannot be photographed by the camera. Therefore, JP2009-146289A discloses a vehicle control device configured to change the shooting direction of the camera from the front of the vehicle to the side of the vehicle and to shoot the road division line on the side of the vehicle, when the distance between the preceding vehicle becomes less than or equal to a predetermined reference value.

SUMMARY

When the vehicle is caused to follow other vehicle, the air resistance of the vehicle can be reduced, so that the energy consumption (fuel consumption or power consumption) of the vehicle can be reduced and the cruising distance of the vehicle can be increased. Therefore, in recent years, a technique related to platoon driving that travels in a row while keeping an inter-vehicle distance between a plurality of vehicles has been developed.

At the time of platoon driving, in order to further reduce the air-resistance of the vehicle, it is assumed that the inter-vehicle distance is made smaller than that at the time of conventional inter-vehicle distance control such as Adaptive Cruise Control (ACC). In local roads, it is assumed that a situation in which sudden braking must be performed due to, for example, a sudden jump-out by a pedestrian occurs. Therefore, from the viewpoint of safety, platoon driving should be carried out not on local roads, but on an expressway for automobiles where pedestrian traffic and parking on the main line are prohibited.

Therefore, in platoon driving, it is necessary to determine whether or not the road on which the vehicle is traveling is the expressway for automobiles. In other words, it is necessary to determine a road type on which the vehicle is traveling. This determination can be made based on camera images, for example. However, for some reason, it may not be possible to make this determination based on the camera images.

The present disclosure has been made in view of the above-described problems, and an object of the present disclosure is to make it possible to discriminate the road type when the road type cannot be discriminated from the camera images.

In order to solve the above problem, a vehicle control system according to an aspect of the present disclosure includes an imaging device configured to capture an image of an outside of a host vehicle and generate an image, and a control device. The control device is configured to determine the road type of the road on which the host vehicle is traveling by recognizing the specific object in the image, and to take a determination measure for determining the road type of the road on which the host vehicle is traveling when the specific object cannot be recognized.

Further, according to an aspect of the present disclosure, a computer program for a control device for controlling a vehicle control system including an imaging device configured to capture an image of an outside of a host vehicle and generate an image is configured to cause a control device to determine a road type of a road on which the host vehicle is traveling by recognizing a specific object in the image, and to take a determination measure for determining a road type of a road on which the host vehicle is traveling when the specific object cannot be recognized.

Further, according to an aspect of the present disclosure, a vehicle control method includes determining a road type of a road on which a host vehicle is traveling by recognizing a specific object in an image generated an imaging device which captures the image of an outside of the host vehicle and taking a determination measure for determining the road type of the road on which the host vehicle is traveling when the specific object cannot be recognized.

According to these aspects of the present disclosure, when the road type cannot be determined from the image generated by the imaging device, the road type can be determined by taking measures necessary for determining the road type.

DESCRIPTION OF EMBODIMENTS

Figure 1:
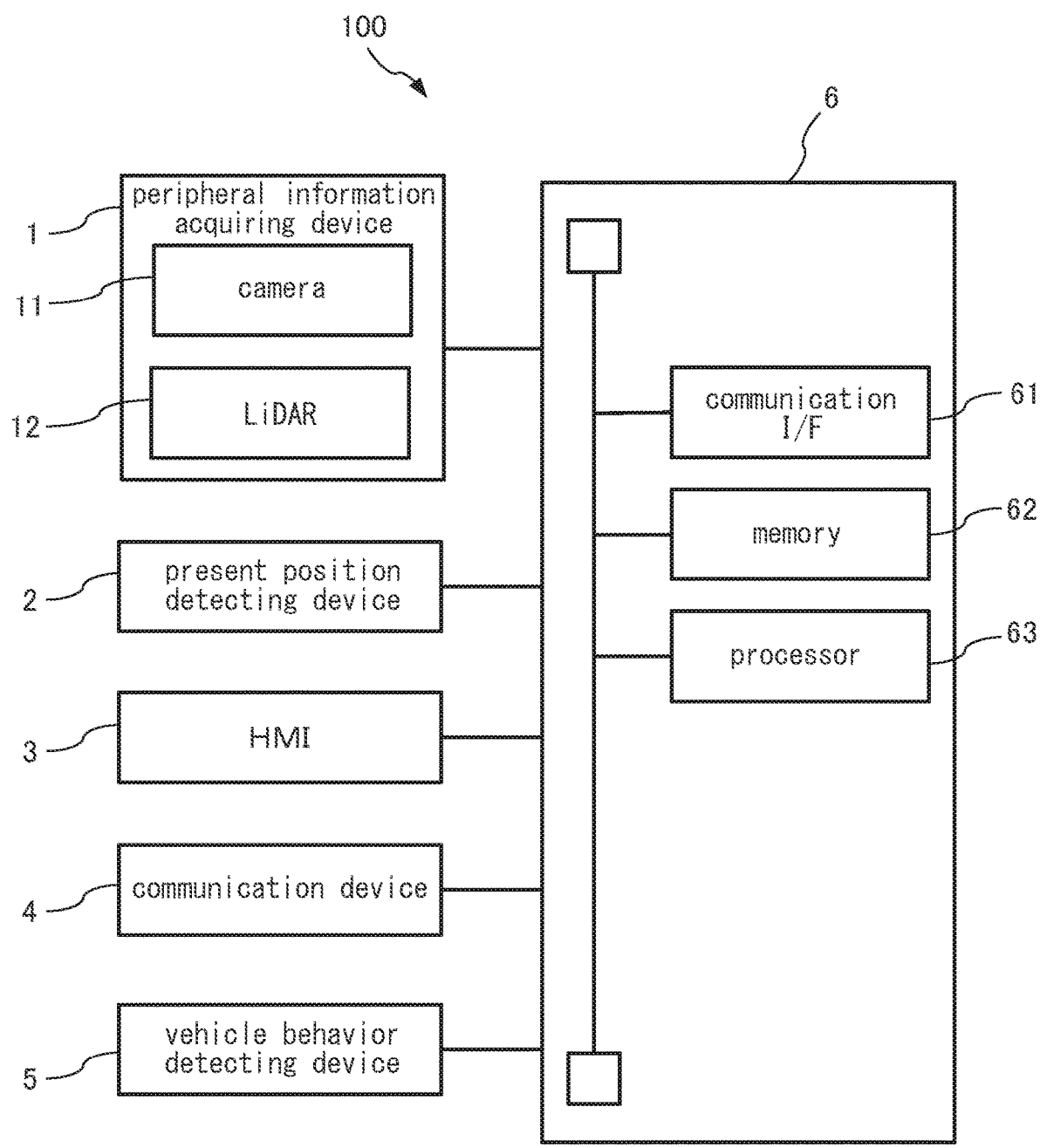
FIG. 1 is a schematic view of the configuration of a vehicle control system according to an embodiment of the present disclosure.

Below, referring to the drawings, embodiments of the present disclosure will be explained in detail. Note that, in the following explanation, similar component elements are assigned the same reference notations.

First Embodiment

FIG. 1 is a schematic view of the configuration of a vehicle control system 100 according to a first embodiment of the present disclosure.

As illustrated in FIG. 1, the vehicle control system 100 according to the present embodiment includes a peripheral information acquiring device 1, a present position detecting device 2, a HMI (Human Machine Interface) 3, a communication device 4, a vehicle behavior detecting device 5, and an electronic control unit 6. The peripheral information acquiring device 1, the present position detecting device 2, HMI 3, the communication device 4, and the vehicle behavior detecting device 5 are electrically connected to the electronic control unit 6 via an in-vehicle network compliant with standards such as CAN (Controller Area Network).

The peripheral information acquiring device 1 is a device for acquiring vehicle peripheral information about a peripheral environment of a host vehicle. The vehicle peripheral information acquired by the peripheral information acquiring device 1 is transmitted to the electronic control unit 6 via the in-vehicle network. The peripheral information acquiring device 1 can be constituted by a single device or a plurality of devices, and can be constituted by, for example, a camera, a LiDAR (Light Detection And Ranging), a millimeter-wave radar sensor, or an ultrasonic sensor. In the present embodiment, the peripheral information acquiring device 1 includes a camera 11 that captures an image in front of the vehicle and generates an image, and a LiDAR 12. In the following description, an image generated by this camera is referred to as a "camera image".

The present position detection device 2 is a device for detecting a present position of the host vehicle (for example, longitude and latitude of the vehicle). Examples of the present position detecting device 2 include, but are not limited to, a GNSS receiver that detects a present position based on satellite radio waves received from a plurality of satellites. The present position of the host vehicle detected by the present position detection device 2 is transmitted to the electronic control unit 6 via the in-vehicle network.

HMI 3 is an interface for inputting and outputting data between the host vehicle and a user of the host vehicle (for example, a driver, an occupant, an external operator of the vehicle, or the like). HMI 3 includes an output device for outputting information to be provided to a user of the host vehicle, and an input device for the user of the host vehicle to perform various input operations. Examples of the output device include a display, a speaker, and a vibration unit. Examples of the input device include a touch panel, an operation button, an operation switch, and a microphone. HMI 3 provides output information received from the electronic control unit 6 via the in-vehicle network to the user of the host vehicle via the output device. HMI 3 also transmits input information inputted via the input device to the electronic control unit 6 via the in-vehicle networking.

HMI 3 can be mounted on the host vehicle in advance, or the terminal owned by the user of the host vehicle (for example, a smart phone, a tablet, a personal computer, or the like) can be connected to the electronic control unit 6 by wire or wirelessly to cause the terminal to function as a HMI 3.

The communication device 4 is a device for communicating with the outside of the host vehicle. The communication device 4 includes a wide area communication device for performing communication with the outside of the host vehicle via a wireless communication network, and a narrow area communication device for performing direct communication between terminals (for example, between vehicle and vehicle, between road and vehicle, between pedestrian and vehicle).

The vehicle behavior detecting device 5 detects a parameter indicating the behavior of the host vehicle. The parameters detected by the vehicle behavior detecting device 5 are transmitted to the electronic control unit 6 via the in-vehicle network. Examples of the vehicle behavior detecting device 5 include a vehicle speed sensor, an acceleration sensor, a steering angle sensor, and the like, and examples of parameters indicating the behavior of the host vehicle include a vehicle speed, an acceleration, a steering angle, and the like detected by these sensors.

The electronic control unit 6 includes a communication interface 61, a memory 62 and a processor 63.

The communication interface 61 includes interface circuitry for connecting the electronic control unit 6 to the in-vehicle network. The electronic control unit 6 is connected to various in-vehicle devices such as the peripheral information acquiring device 1 described above via the communication interface 61.

The memory 62 includes a storage medium such as a HDD (Hard Disk Drive), an optical recording medium, or a semi-conductor memory. The memory 62 stores various computer programs, data, and the like executed by the processor 63. The memory 62 stores data generated by a computer program, data received from various in-vehicle devices via the communication interface 61, and the like.

The processor 63 includes one or more CPU (Central Processing Unit) and peripheral circuitry thereof. The processor 63 executes various kinds of processing based on various kinds of computer programs stored in the memory 62. For example, the processor 63 performs an object detection process on the received camera image every time the camera image is received from the camera 11 while the host vehicle is traveling, and executes a vehicle control process according to the result. Hereinafter, the vehicle control process will be described with reference to FIG. 2.

Figure 2:
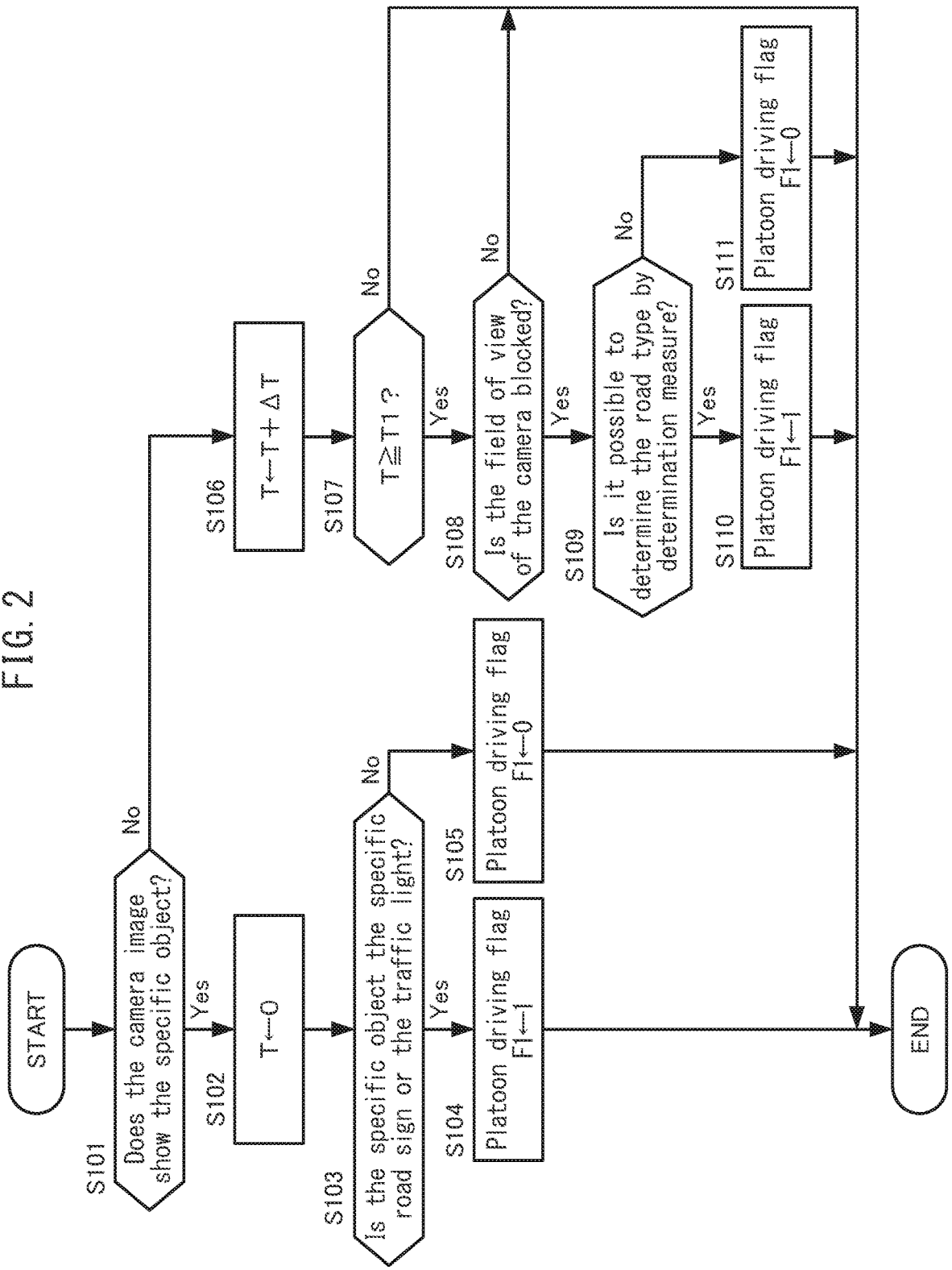
FIG. 2 is a flowchart explaining a vehicle control process according to the first embodiment of the present disclosure.

FIG. 2 is a flowchart explaining the vehicle control process according to the first embodiment of the present disclosure.

At step S101, the electronic control unit 6, upon receiving the camera image, checks whether a specific object appears in the camera image. Whether or not the specific object appears in the camera image can be confirmed by inputting the camera image to a discriminator such as a deep neural network learned according to a learning method such as an error back propagation method using a large number of teacher images, for example.

The specific object is an object installed on a road on which it is possible to determine whether the road on which the host vehicle is traveling is a local road, or an expressway for automobiles dedicated to automobiles on which traffic such as pedestrians, and parking and stopping on a main line are prohibited. That is, the specific object is an object installed on a road that can determine the road type of the road on which the host vehicle is traveling. Examples of such the specific object include a road sign and a traffic light. This is because, if the road sign is a specified road sign indicating that the road in front of the host vehicle or the road on which the host vehicle is traveling is the expressway, these roads can be recognized as the expressway. This is also because it is safe to assume that a road is a local road if a traffic light is present.

When the specific object is shown in the camera image, that is, when the specific object is confirmed in the camera image, the electronic control unit 6 proceeds to the process of the step S102. On the other hand, if the electronic control unit 6 is unable to confirm the specific object in the camera image, the process proceeds to the step S106.

At step S102, the electronic control unit 6 returns the count timer T for calculating the elapsed time (hereinafter referred to as the "unidentified time of the specific object") from when the specific object is no longer visible to the camera image to zero.

At step S103, the electronic control unit 6 proceeds to step S104 if the specific object in the camera image was a specific road sign or a traffic light. On the other hand, if the specific object in the camera-image is a road sign but not the specific road sign, the electronic control unit 6 proceeds to the process of the step S105.

At step S104, the electronic control unit 6 sets a platoon driving flag F1 to 1. The platoon driving flag F1 is a flag set to 1 when it is confirmed that the road on which the host vehicle is traveling is the expressway, and the default is set to 0.

When the platoon driving flag F1 is set to 1, the electronic control unit 6 starts platoon driving automatically or in response to a request from the user of the host vehicle. When platoon driving is started, the electronic control unit 6 creates a driving plan of the host vehicle on the basis of the vehicle peripheral information and the like so that the host vehicle can change the lane in accordance with the lane change of the preceding vehicle while keeping the inter-vehicle distance to the preceding vehicle constant, or can follow the preceding vehicle while tracing the position in the lane of the preceding vehicle, and performs the autonomous driving in which the driving operation related to the acceleration, the steering, and the braking is automatically performed in accordance with the driving plan. By performing platoon driving, the air resistance of the host vehicle can be reduced by causing the host vehicle to follow the other vehicle. Therefore, it is possible to increase the cruising distance of the host vehicle by reducing the energy consumption (fuel consumption or power consumption) of the host vehicle.

When platoon driving is started in response to a request from the user of the host vehicle, it is desirable to propose to the user of the host vehicle to perform platoon traveling via HMI 3 or to request permission to perform platoon driving when the platoon driving flag F1 is changed to 1.

At step S105, the electronic control unit 6 sets the platoon driving flag F1 to 0.

At step S106, the electronic control unit 6 calculates the elapsed time since the specific object is no longer visible in the camera image, that is, the unidentified time of the specific object. Specifically, the electronic control unit 6 adds the calculation cycle (photographing cycle of the camera 11) ΔT to the previous value of the count timer T.

At step S107, the electronic control unit 6 determines whether or not the counting timer T is equal to or greater than a predetermined threshold T1. When the count timer T is equal to or larger than the threshold T1, the electronic control unit 6 processes to S108. On the other hand, when the count timer T is less than the threshold T1, the electronic control unit 6 ends the present process.

Figure 3A:
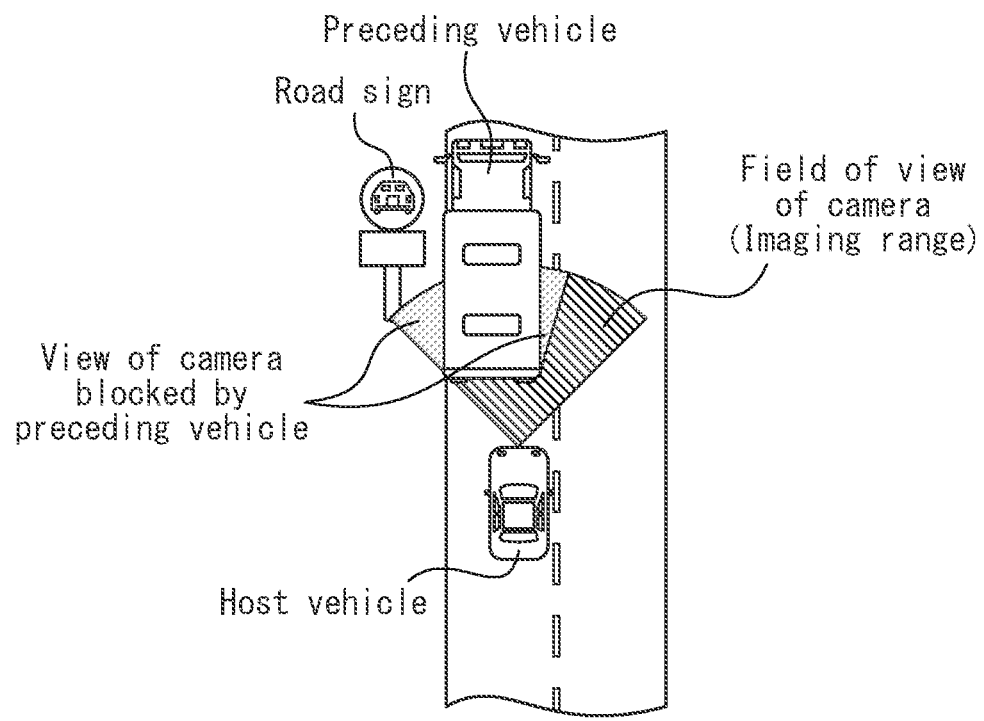
FIG. 3A shows the view of the vehicle being obstructed by the preceding vehicle due to the close distance between the vehicle and the preceding vehicle traveling on the same lane.
Figure 3B:
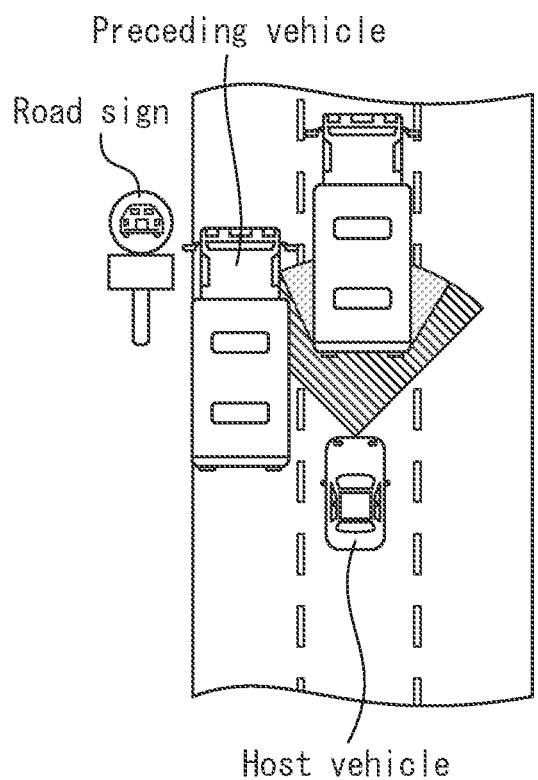
FIG. 3B shows the view of the vehicle being obstructed by the preceding vehicle due to the close distance between the vehicle and the preceding vehicle traveling along the adjoining lane.

At step S108, the electronic control unit 6 determines whether or not the field of view of the camera 11 is blocked by the preceding vehicle due to the fact that the distance between the preceding vehicle traveling on the same lane or the adjoining lane is close, for example, as shown in the FIG. 3A and the FIG. 3B. The determination can be made, for example, by measuring the inter-vehicle distance to the preceding vehicle using the LiDAR 12, the millimeter wave radar sensor, the ultrasonic sensor, or the like. Specifically, if the inter-vehicle distance from the preceding vehicle is less than the predetermined distance, it can be determined that the field of view of the camera 11 is blocked by the preceding vehicle. Note that the method is not limited to such a method, and for example, as in the case where recognition of the specific object is performed, determination may be made from a camera image using a discriminator such as the deep neural network.

If the field of view of the camera 11 is blocked by the preceding vehicle, the electronic control unit 6 determines that this is the reason why the road signs and the traffic lights on the shoulder or above the road are not visible in the camera image and proceeds to step S109. On the other hand, if the field of view of the camera 11 is not blocked by the preceding vehicle, the electronic control unit 6 ends the current processing.

At step S109, the electronic control unit 6 determines whether or not the road type of the road on which the host vehicle is traveling can be determined by taking a determination measure required for determining the road type of the road on which the host vehicle is traveling. In the present embodiment, as a determination measure, a measure for determining the road type without using the camera image is taken. As such a determination measure, for example, a measure for determining the road type of the road on which the host vehicle is traveling based on the current position of the host vehicle and the map information, a measure for determining the road type on the basis of a signal (for example, a signal including the road type information) received from the roadside device by road-to-vehicle communication, a measure for determining the road type on the basis of the road type information inputted by the user of the host vehicle via HMI 3, and the like are exemplified.

At step S110, the electronic control unit 6 sets the platoon driving flag F1 to 1.

At step S111, the electronic control unit 6 sets the platoon driving flag F1 to 0.

The vehicle control system 100 according to the present embodiment described above includes a camera 11 (imaging device) configured to capture an image of the outside of the host vehicle and generate a camera image, and an electronic control unit 6 (control device). The electronic control unit 6 is configured to determine the road type of the road on which the host vehicle is traveling by recognizing a specific object in the camera image, and to take a determination measure for determining the road type of the road on which the host vehicle is traveling when the specific object cannot be recognized.

Due to this, even when the road type cannot be determined from the camera image, the road type can be determined by taking necessary measures for determining the road type.

In particular, in the present embodiment, the electronic control unit 6 is configured to take a measure for determining the road type without using the camera images, such as a measure for determining the road type based on the present position of the host vehicle and the map information, a measure for determining the road type based on the signal received from the roadside device, and a measure for determining the road type based on the road type information inputted by the user of the host vehicle via HMI 3.

Due to this, when the road type cannot be determined from the camera image, the road type can be determined by using a road type determination method that does not use the camera image.

Further, in the present embodiment, the electronic control unit 6 is configured to, when the road type of the road on which the host vehicle is traveling is a road on which travel other than an automobile is prohibited, automatically perform platoon traveling on the road, propose to the user of the host vehicle to perform platoon traveling on the road via HMI 3, or request the user of the host vehicle to perform platoon traveling on the road via HMI 3.

Due to this, when the vehicle is traveling on the expressway for automobiles that does not have a fear of a pedestrian jumping out as compared with the local road, it is possible to increase the cruising distance of the vehicle by performing platoon traveling.

Second Embodiment

Next, a second embodiment of the present disclosure will be described. The present embodiment is different from the first embodiment in the content of the determination measure. Hereinafter, the differences will be mainly described.

Figure 4:
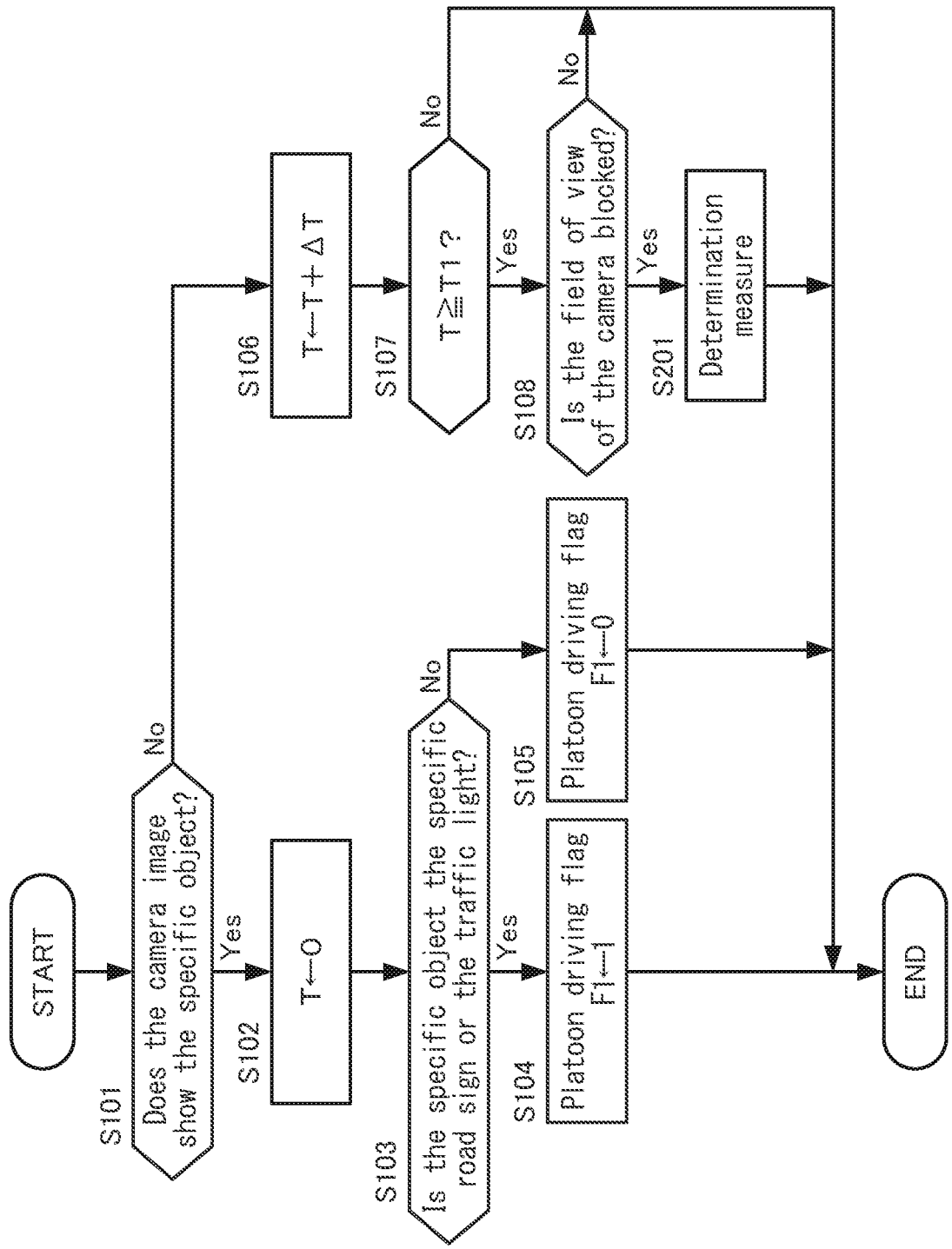
FIG. 4 is a flowchart explaining a vehicle control process according to a second embodiment of the present disclosure.

FIG. 4 is a flowchart explaining an example of a vehicle control process according to the present embodiment. In FIG. 4, the content of the process of the steps S101 to S108 is the same as that of the first embodiment, and therefore will not be described here.

In the above-described first embodiment, as the determination measure, a measure for determining the road type without using the camera image is taken. On the other hand, in the present embodiment, in order to be able to determine the road type using the camera images, in the step S201, the electronic control unit 6 takes a measure of making the inter-vehicle distance between the vehicle traveling in the same lane as the host vehicle or the vehicle traveling in the neighboring lane larger than the present inter-vehicle distance as a determination measure.

For example, the electronic control unit 6 increases the target inter-vehicle distance, when the driving operation related to accelerate and braking is automatically performed so that the inter-vehicle distance to the preceding vehicle becomes the target inter-vehicle distance. When the reason why the specific object is not reflected in the camera image is that the inter-vehicle distance between the preceding vehicle traveling on the same lane or the adjacent lane is too close, that is, when the field of view of the camera is blocked by the preceding vehicle, the cause can be eliminated by increasing the inter-vehicle distance between the preceding vehicle and the preceding vehicle.

Note that the timing for restoring the target inter-vehicle distance is not limited. For example, the timing for restoring the target inter-vehicle distance can be the timing when the specific object is subsequently recognized in the camera image. For example, the timing at which the target inter-vehicle distance is restored can be the timing at which a predetermined time has elapsed after the target inter-vehicle distance is increased.

Further, the target inter-vehicle distance may be increased by a predetermined distance until a predetermined upper limit inter-vehicle distance is reached, for example, every time the process proceeds to the step S201, and may be returned to the original state at the predetermined timing, or may be increased to a certain inter-vehicle distance after the process proceeds to the step S201 once, and returned to the original state at the predetermined timing.

Above, embodiments of the present disclosure were explained, but the above embodiments only show some of the examples of application of the present disclosure. It is not meant to limit the technical scope of the present disclosure to the specific constitutions of the embodiments.

For example, in the above-described embodiment, the computer program executed in the electronic control unit 6 of the vehicle control system 100 may be provided in a form recorded in a computer-readable portable recording medium such as a semiconductor memory, a magnetic recording medium, or an optical recording medium.

The invention claimed is:

1. A vehicle control system comprising a peripheral information acquiring device including an imaging device configured to capture an image of an outside of a host vehicle to generate an image and a LiDAR device configured to measure an inter-vehicle distance to a preceding vehicle, and a control device, wherein
the control device is configured to:
determine a road type of a road on which the host vehicle is traveling by recognizing a specific object in the image;
take, as a determination measure for determining the road type of the road on which the host vehicle is traveling, a measure of increasing an inter-vehicle distance between a preceding vehicle traveling in the same lane as the own vehicle or a preceding vehicle traveling in an adjacent lane than a current inter-vehicle distance, when the specific object cannot be recognized,
determine whether a field of view of the imaging device is blocked by the preceding vehicle by measuring the inter-vehicle distance using the LiDAR device, wherein the field of view is determined to be blocked when the inter-vehicle distance is less than a predetermined threshold; determine whether the road type is an expressway;
start platoon driving automatically by creating a driving plan of the host vehicle on the basis of vehicle peripheral information so that the host vehicle can change a lane in accordance with a lane change of the preceding vehicle while keeping the inter-vehicle distance to the preceding vehicle constant, and perform autonomous driving in which a driving operation related to acceleration, steering, and braking is automatically performed in accordance with the driving plan; and
return the inter-vehicle distance to an original state when the specific object is subsequently recognized in the image.

2. The vehicle control system according to claim 1, wherein
a HMI configured to be able to input and output information is further provided, and
the control device is configured to, when the road type of the road on which the host vehicle is traveling is a road on which travel other than an automobile is prohibited, automatically perform platoon driving on the road, propose to a user of the host vehicle via HMI to perform a platoon driving on the road; or request a user of the host vehicle via HMI to perform a platoon driving on the road.

3. The vehicle control system according to claim 1, wherein the specific object is a road sign or a traffic light.

* * * * *